United States Patent
Gudenburr et al.

(10) Patent No.: US 6,744,469 B1
(45) Date of Patent: Jun. 1, 2004

(54) ILLUMINATION COMPENSATION USING BUILT-IN REFERENCE

(75) Inventors: John C. Gudenburr, Canton, MI (US); William L. Kozlowski, Novi, MI (US); Christopher N. St. John, Plymouth, MI (US); John D. Vala, Plymouth, MI (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/459,555

(22) Filed: Dec. 13, 1999

(51) Int. Cl.[7] .................. H04N 5/222; H04N 5/235; H04N 1/46; H04N 1/04
(52) U.S. Cl. ............. 348/370; 348/229.1; 358/504; 358/505; 358/509; 358/513; 358/516; 358/474; 358/475
(58) Field of Search .................. 348/370, 229.1; 358/504, 505, 509, 513, 516, 474, 475

(56) References Cited

U.S. PATENT DOCUMENTS

| | | | |
|---|---|---|---|
| 5,170,267 A | * | 12/1992 | Blitz et al. .................. 358/475 |
| 5,291,307 A | * | 3/1994 | Luckhurst .................. 358/474 |
| 5,386,299 A | * | 1/1995 | Wilson et al. .............. 358/504 |
| 5,729,361 A | * | 3/1998 | Suggs et al. ............... 358/475 |
| 5,757,520 A | * | 5/1998 | Takashima ................. 348/294 |
| 6,191,873 B1 | * | 2/2001 | Mizoguchi et al. ......... 358/516 |

* cited by examiner

Primary Examiner—Andrew Christensen
Assistant Examiner—Nhan Tran
(74) Attorney, Agent, or Firm—Lise A. Rode; Brooks Kushman P.C.; Mark T. Starr

(57) ABSTRACT

A method and system provide for real-time compensation of an imaging system for variations in illumination intensity. An illumination system provides reflected illumination, and a charge coupled device system directly detects the reflected illumination from the illumination system. The CCD system then converts the reflected illumination into illumination data and a host processor converts the illumination data into adjusted control data and final image data. The adjusted control data is based on an illumination profile and a reference illumination intensity. The reference illumination intensity is measured before each document with a compensation reference, and is compared to the illumination profile to adjust control parameters in a real-time mode. Directly measuring the illumination intensity with the CCD system allows for a reduction in parts, manufacturing steps, and errors.

18 Claims, 8 Drawing Sheets

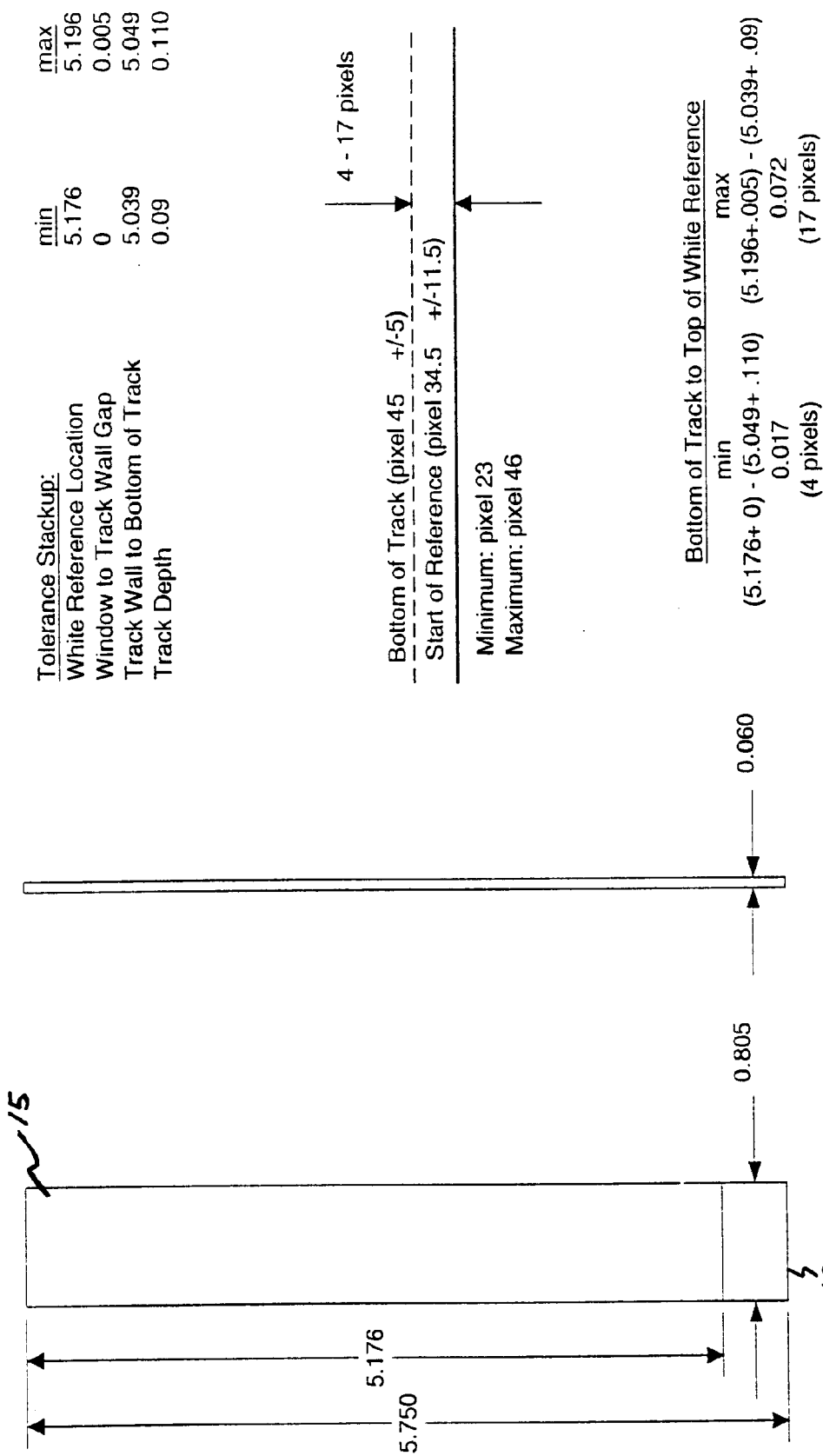

ILLUMINATION COMPENSATION USING BUILT-IN REFERENCE

BACKGROUND OF THE INVENTION

1. Field of the Invention

The present invention relates generally to imaging financial documents. More particularly, the present invention relates to the use of a charge coupled device and a compensation reference to compensate for intensity variations during document imaging.

2. Background

In the banking industry, many interrelated functions must be performed on a daily basis and in an effective manner. For example, checks and deposit slips are commonly processed at extremely high rates. To further complicate matters, the processing of these documents must also be coordinated between institutions. Computerized document processing systems have therefore evolved over the years to assist in handling high throughput and increasing feature set.

Imaging is an important aspect of document processing systems with respect to financial institutions. For example, digital customer identification can often be critical and is relied upon heavily for transactions involving high dollar amounts. As a result, signature cards are commonplace and photographic identification is becoming increasingly popular with the advancement of digital signal processing. Check imaging is also very important. Image-enabled document processors with camera illumination systems are therefore a part of everyday banking functions. In fact, virtually every FDIC institution employs some type of camera illumination system for imaging and digitizing information contained on checks and other financial documents.

Imaging systems typically use a light source, such as a circuit board with an array of LEDS, to illuminate the subject. The source illumination is reflected back from the subject and harnessed by an optical system having lenses and mirrors. The intensity of the reflected illumination is used to control the illumination level of the final image. Light sources such as LEDS, however, are susceptible to aging and changes due to heat. Aging and heat in turn affects illumination intensity. The result is a variation in illumination intensity for the same control settings. For example, as ambient temperature increases, the relative intensity of an LED will decrease for the same LED current level. Recognizing this, conventional systems attempt to compensate for intensity variations due to heat and age. One approach is to use a photo-sensor to measure the intensity of light reflected from the subject. This information is then passed on to a host processor which calculates adjusted control data based on the measured intensity. A charge coupled device (CCD) also detects the reflected illumination and is used by the host processor in conjunction with the photo-sensor to produce the final image with the appropriate illumination level. A difficulty associated with using a photo-sensor to gage the illumination intensity of the light source is the possibility of errors due to variability in parts, alignment and sensitivity tolerances. It is therefore desirable to reduce the error associated with compensating for variations in illumination intensity. It is also desirable to reduce the number of parts and manufacturing steps associated with such compensation.

Other approaches use fixed time intervals or a temperature sensor, such as a thermistor, to determine intensity variation. Under such approaches, an indirect approximation can be made on the basis of a known age and temperature. These approaches, however, are subject to the same difficulties noted above. Approximating illumination intensity further increases the potential for error and adds overall processing costs to the system.

SUMMARY OF THE INVENTION

In a first aspect of the invention, an imaging system for an image-enabled document processor includes an illumination system, a CCD system, and a host processor. The illumination system provides reflected illumination, and the CCD system directly detects the reflected illumination from the illumination system. The CCD system further converts the reflected illumination into illumination data. The host processor converts the illumination data from the CCD system into image data and adjusted control data, wherein the adjusted control data sets the new illumination drive control.

In a second aspect of the invention, a computerized method for imaging a document includes the step of generating an illumination profile for an imaging system. Adjusted control data is then generated for the imaging system based on the illumination profile and a reference illumination intensity. The method further provides for imaging the document with the adjusted control data.

In a third aspect of the invention, a computerized method for generating adjusted control data for an imaging system based on an illumination profile and a reference illumination intensity is provided. Reference control data is generated, and a reference illumination intensity is directly measured with a CCD. The method further provides for calculating the adjusted control data.

BRIEF DESCRIPTION OF THE DRAWINGS

The invention is set forth in exemplary fashion by the following detailed description of a preferred embodiment taken in conjunction with the drawings, in which:

FIG. 9*a* is a front view of a compensation reference and a reference gage according to the preferred embodiment of the present invention;

FIG. 9*b* is a side view of the compensation reference and the reference gage in FIG. 9*a*.

DETAILED DESCRIPTION OF THE PREFERRED EMBODIMENT

Figure 1:
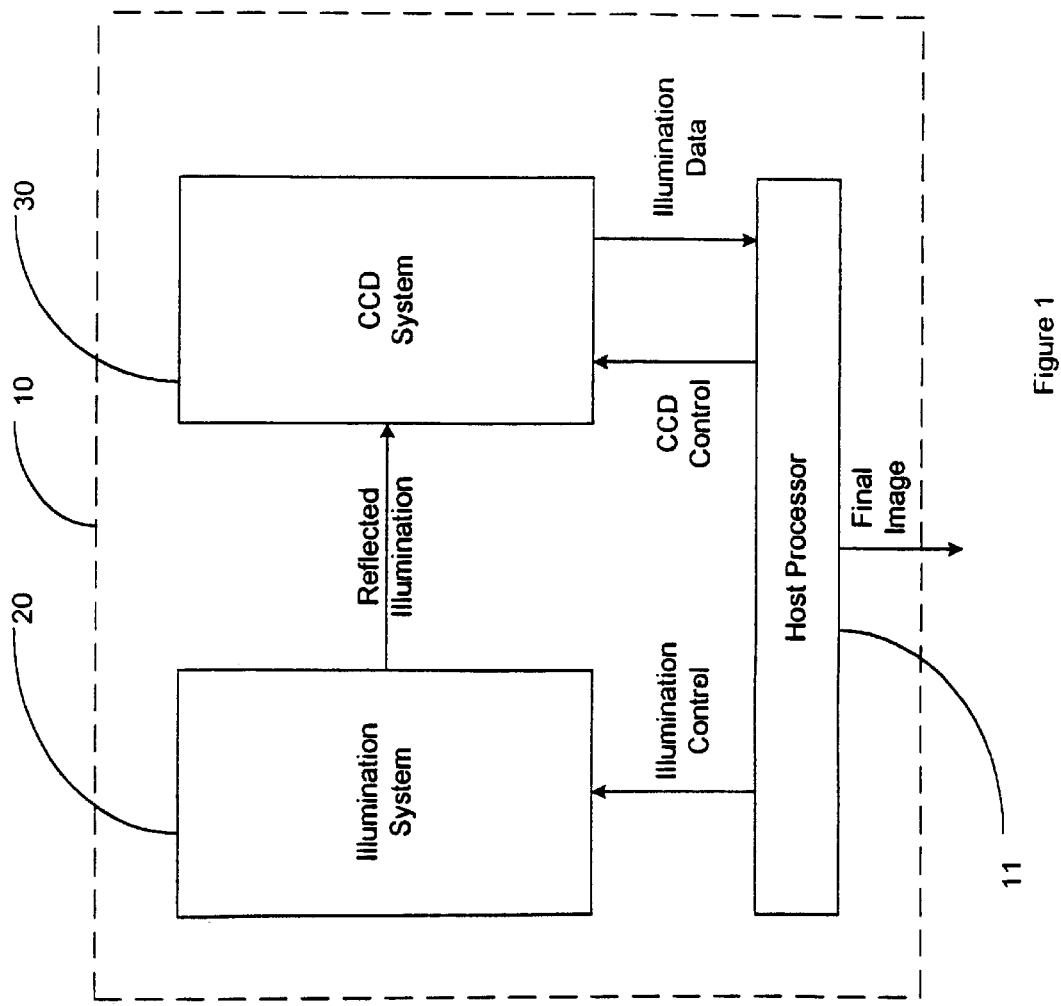
FIG. 1 is a block diagram of an imaging system for an image-enabled document processor according to the present invention.
Figure 10:
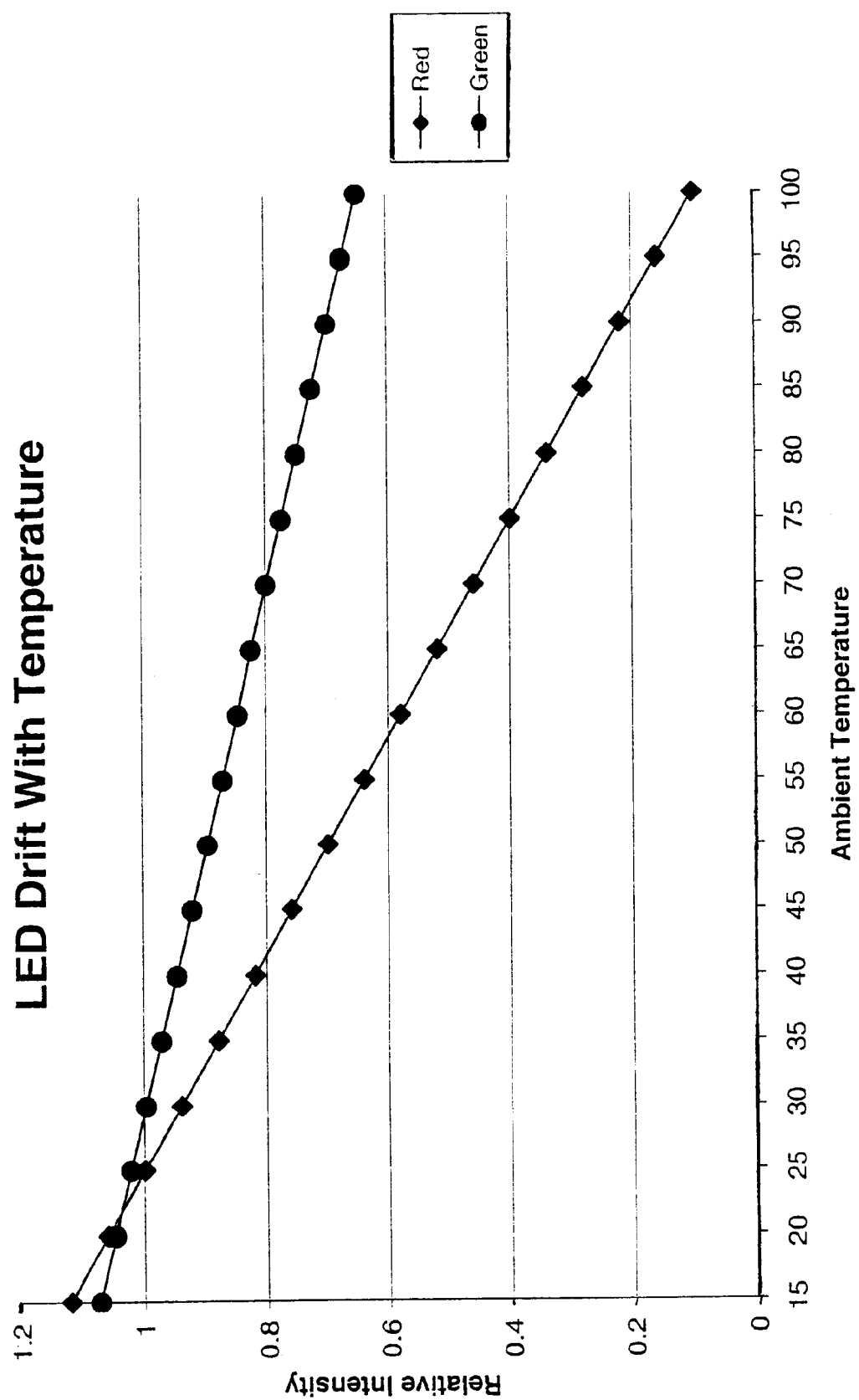
FIG. 10 is a plot of red and green LED temperature drift.

As shown in FIG. 1, according to the present invention, an imaging system 10 for an image-enabled document processor includes an illumination system 20, a CCD system 30, and a host processor 11. While the preferred embodiment of the imaging system 10 is used for a check processor, other documents can be imaged without parting from the scope of the invention. The imaging system 10 is able to compensate for variations in illumination intensity in a real-time mode. FIG. 10 shows a plot of red and green LED temperature drift. Returning to FIG. 1, it can be seen that the illumination system 20 provides reflected illumination and the CCD system 30 directly detects the reflected illumination from the illumination system 20. The CCD system 30 further converts the reflected illumination into illumination data and the host processor 11 converts the illumination data from the CCD system 30 into adjusted control data and final image data.

Figure 2:
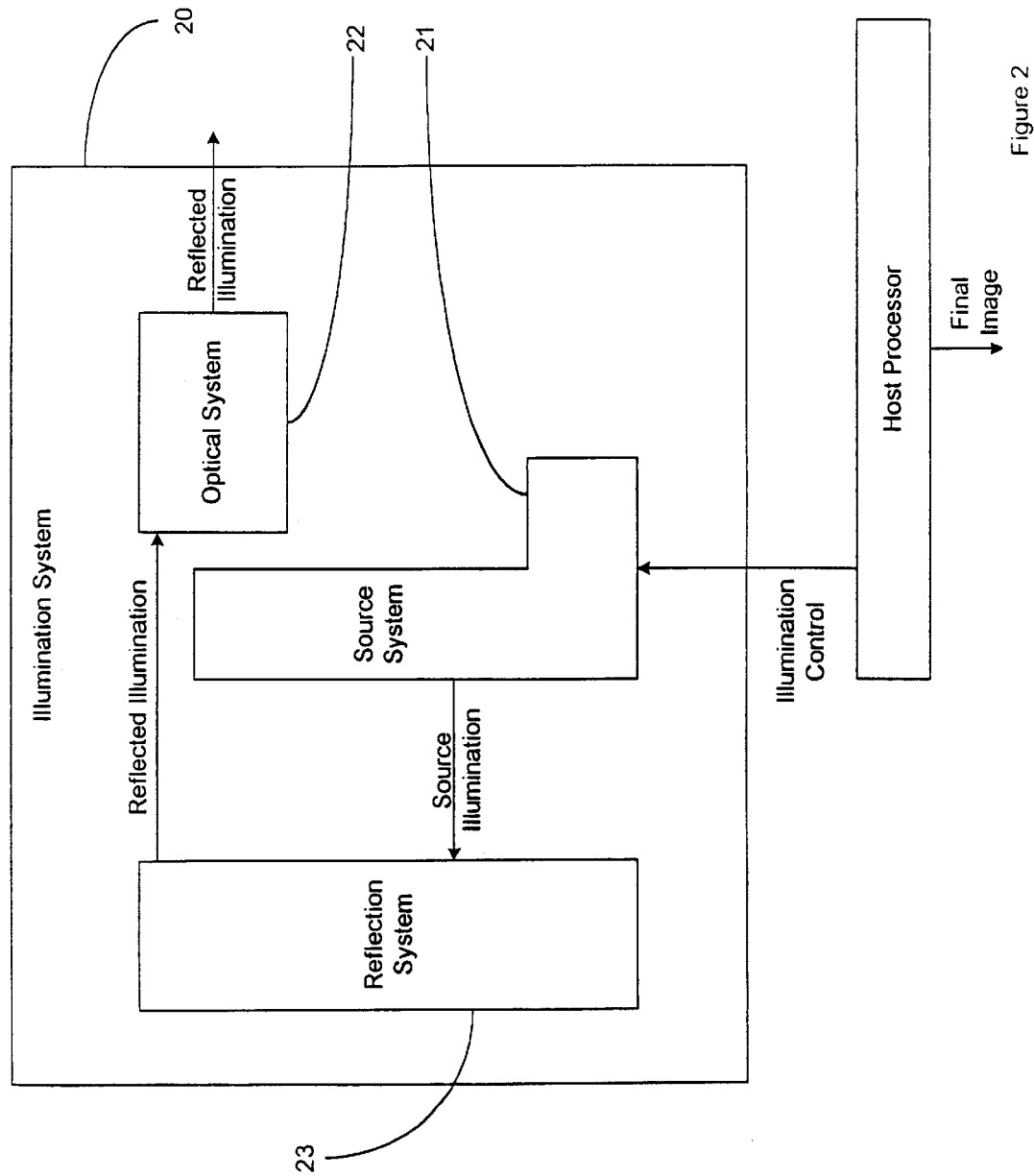
FIG. 2 is a more detailed block diagram of the illumination system in FIG. 1.

Turning now to FIG. 2, the illumination system 20 is shown in greater detail. It will therefore be appreciated that a source system 21 generates source illumination in response to the illumination control data. An optical system 22 provides the CCD system 30 with reflected illumination based on reflection of the source illumination by a subject. The optical system 22 therefore provides the reflected illumination a path to the CCD system 30. It will further be appreciated that a reflection system 23 exposes the subject to the source illumination. As already discussed, conventional approaches employ an illumination intensity detection device which is separate from the CCD, whereas the present invention incorporates compensation into the operation of the CCD. The result is a reduction in overall components, a reduction in manufacturing costs, and a significant decrease in errors.

Figure 3:
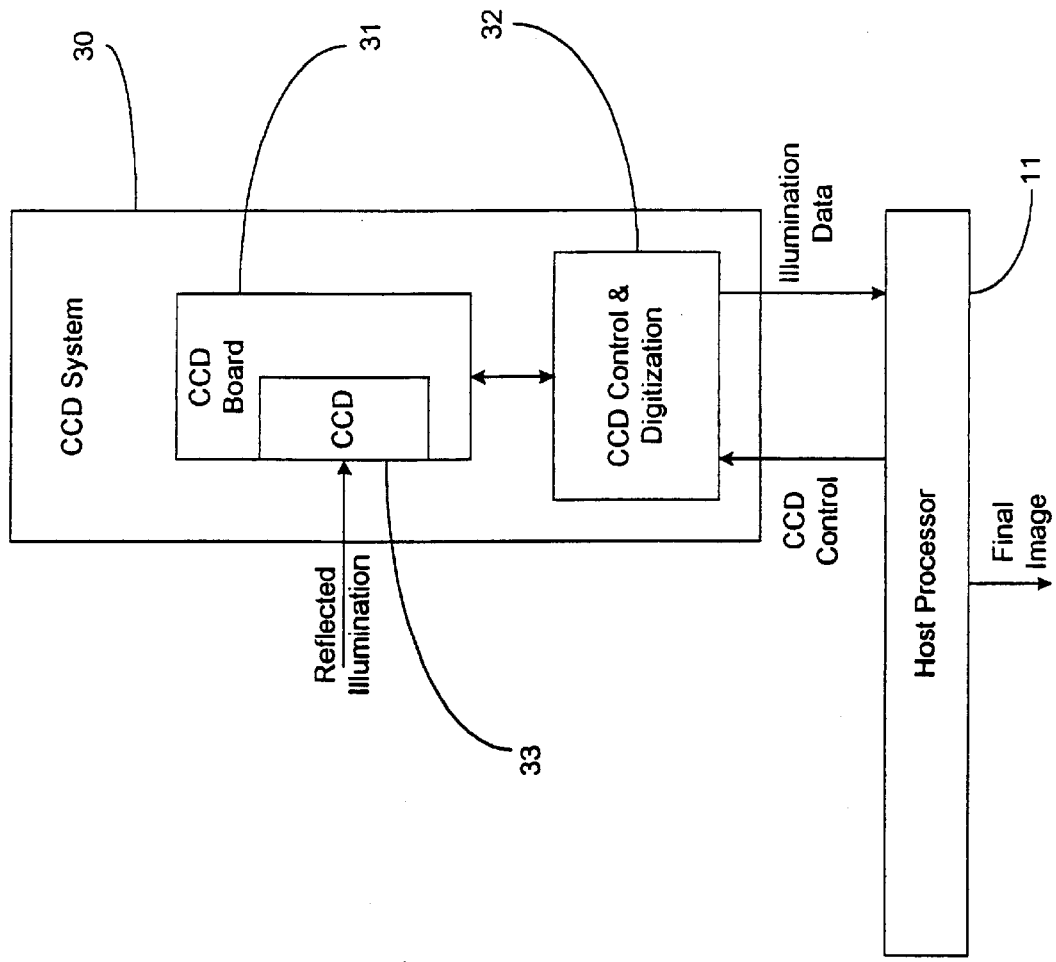
FIG. 3 is a more detailed block diagram of the CCD system in FIG. 1.

As shown in FIG. 3, it can be seen that the CCD system 30 preferably has a CCD board 31 and a CCD controller 32. The CCD board 31 has a CCD 33 for directly detecting the reflected illumination. The CCD board 31 then converts the reflected illumination into illumination data. It will be appreciated that the CCD controller 32 digitizes the illumination data and controls the CCD board 31 based on the CCD control data from the host processor 11.

Figure 4:
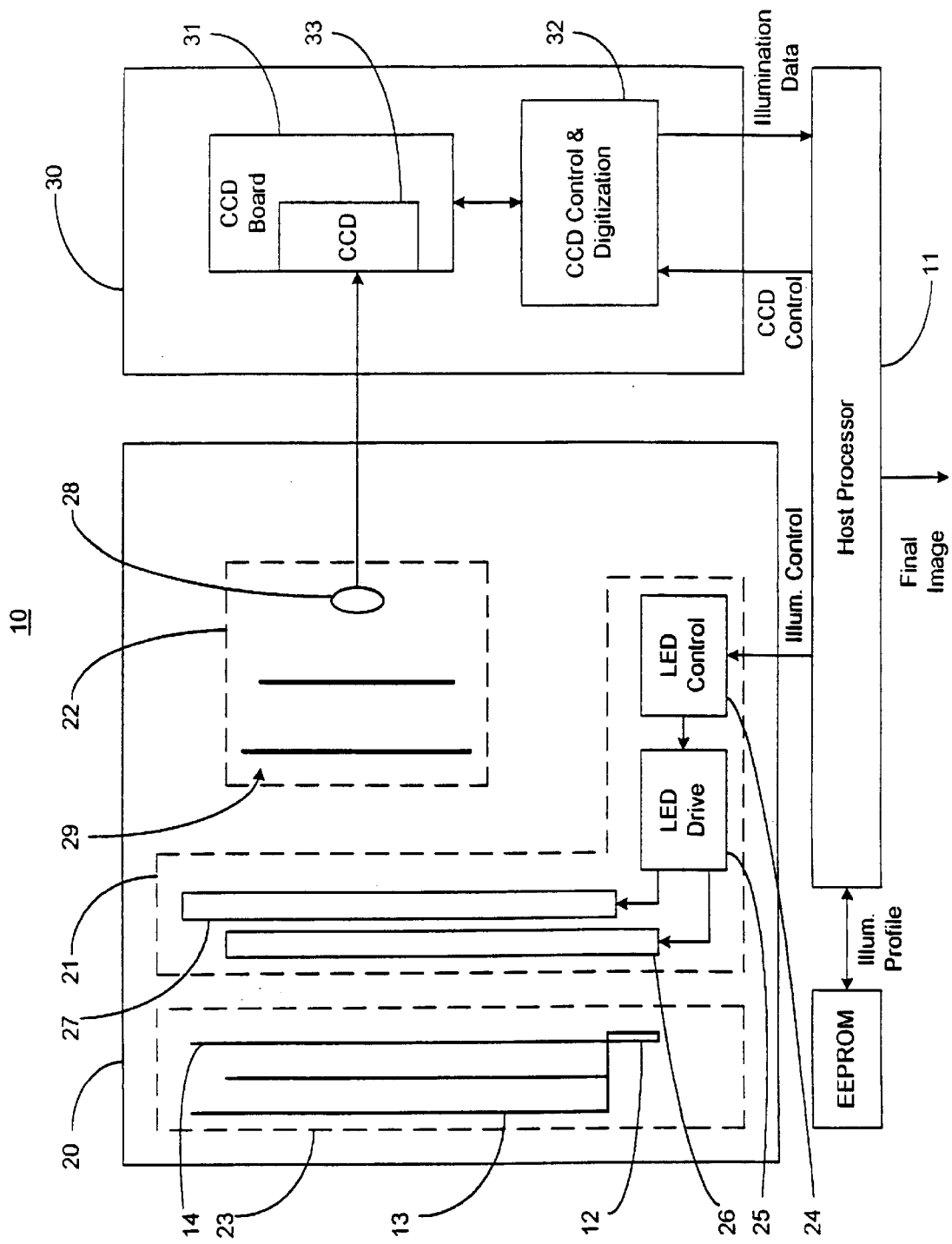
FIG. 4 is a detailed view of an imaging system according to a preferred embodiment of the present invention.

Turning now to FIG. 4, a detailed view of the imaging system 10 for an image enabled document processor is shown in its preferred embodiment. Specifically, the source system 21 of the illumination system 20 includes an LED control circuit 24 for converting the illumination control data into illumination drive data. An LED drive circuit 25 converts the illumination drive data into illumination source data. It will further be appreciated that an LED board configuration has a first board 27, and a second board 26. The use of multiple boards provides more even lighting of the subject and eliminates the "gripple" effect common to imaging applications. The optical system 22 of the illumination system 20 has a lens configuration 28 and a mirror configuration 29. It will be appreciated that the lens configuration 28 collects the reflected illumination and focuses the reflected illumination on the CCD system 30. It will further be appreciated that the mirror configuration 29 directs the reflected illumination from the reflection system 23 to the lens configuration 28. The reflection system 23 of the illumination system 20 has a compensation reference 12 disposed outside the document field of view. The compensation reference 12 is the subject during adjustment of the imaging system 10. As best seen in FIGS. 9a and 9b, a white reference gage 15 is temporarily disposed in the document plane and is the subject during calibration of the imaging system 10. Returning to FIG. 4, it can be seen that a rear track wall 13 provides mechanical guidance to a first side of the document being imaged. Thus, the document is the subject during imaging. A front track wall 14 provides mechanical guidance to the second side of the document. It will be appreciated that the front track wall 14 has a window allowing the source illumination to interact with the document.

Figure 6:
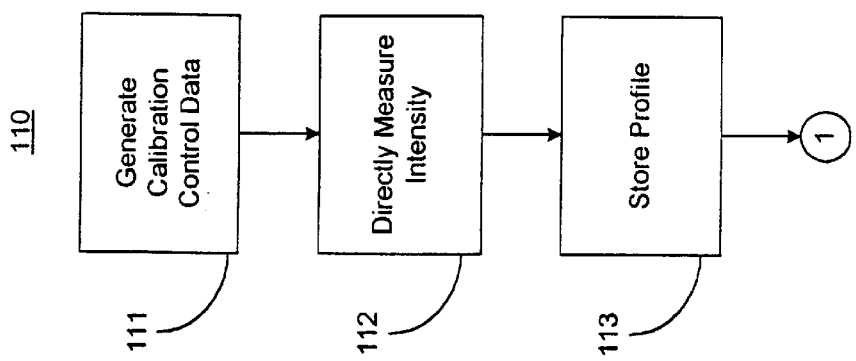
FIG. 6 is a more detailed flow chart of the step of generating a profile in FIG. 5.
Figure 5:
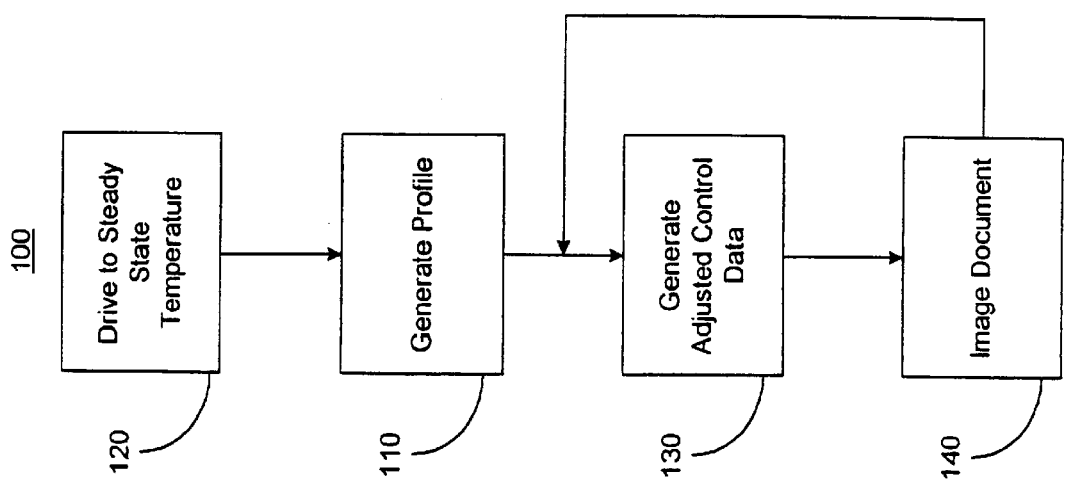
FIG. 5 is a flow chart of a computerized method for imaging a document according to the present invention.

Turning now to FIG. 5, a flow chart of a computerized method for imaging documents is shown at 100 for programming purposes. It will be appreciated that the host processor can be readily programmed to execute the necessary commands during warm-up, calibration, compensation, and imaging. When the imaging system determines that the source system has been off prior to calibration, the imaging system will turn the source system on at maximum current for a fixed warm-up time. Thus, at Step 120 the source system is driven to its steady state temperature. This step effectively brings the imaging system to a control state which is near that of the normal operation control state. An illumination profile is then generated for the imaging system at Step 110. As will be discussed later, after the image-enabled document processor is assembled, the imaging system goes through a calibration process that stores information about the uniformity and intensity of light reflected back to the imaging system from a white reference gage. The reference gage is placed in the document plane of the track. Due to the mechanical arrangement of this white reference gage, track, and the compensation reference located at the bottom of the track wall window, the calibration procedure can permanently store information about the illumination profile in the document plane of the track. At Step 130, adjusted control data is generated for the imaging system based on the illumination profile and a reference illumination intensity. The reference illumination intensity is the intensity measured by the CCD just before imaging. It can be appreciated that at Step 140 the document is imaged with the adjusted control data. The Step 110 of generating an illumination profile will now be discussed in greater detail. Turning to FIG. 6, it can be seen that calibration control data is generated at Step 111. Preferably, the calibration control data includes calibration illumination control data and calibration CCD control data. Specifically, the calibration illumination control data includes calibration LED current data. Similarly, the calibration CCD control data includes calibration CCD gain and off-set data. Turning to Step 112, it can be seen that the calibration illumination intensity is directly measured with the CCD. The calibration control data and the calibration illumination intensity are then stored to a computer readable memory at Step 113. This information represents the illumination profile and is used later for imaging.

Figure 7:
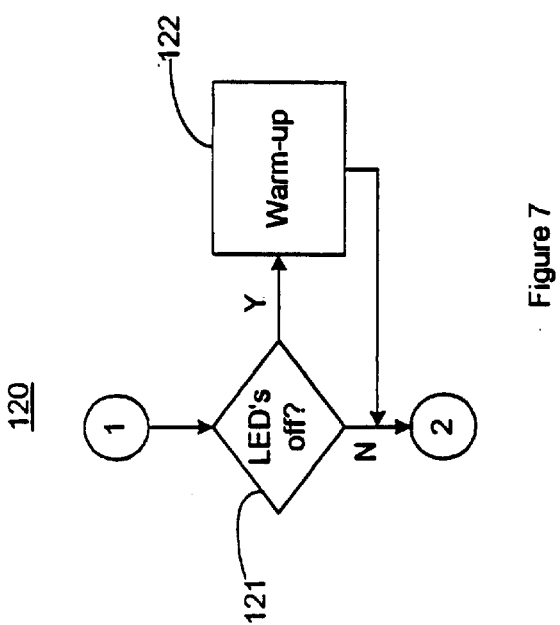
FIG. 7 is a more detailed flow chart of the step of driving the light source to a steady state temperature in FIG. 5.

FIG. 7 shows the process of driving the source system to the steady state temperature in greater detail. At Step 121, the imaging system checks to determine whether the source system has been turned off for a predetermined amount of time. If the source system has been turned off, a warm-up is required and is performed at Step 122.

Figure 8:
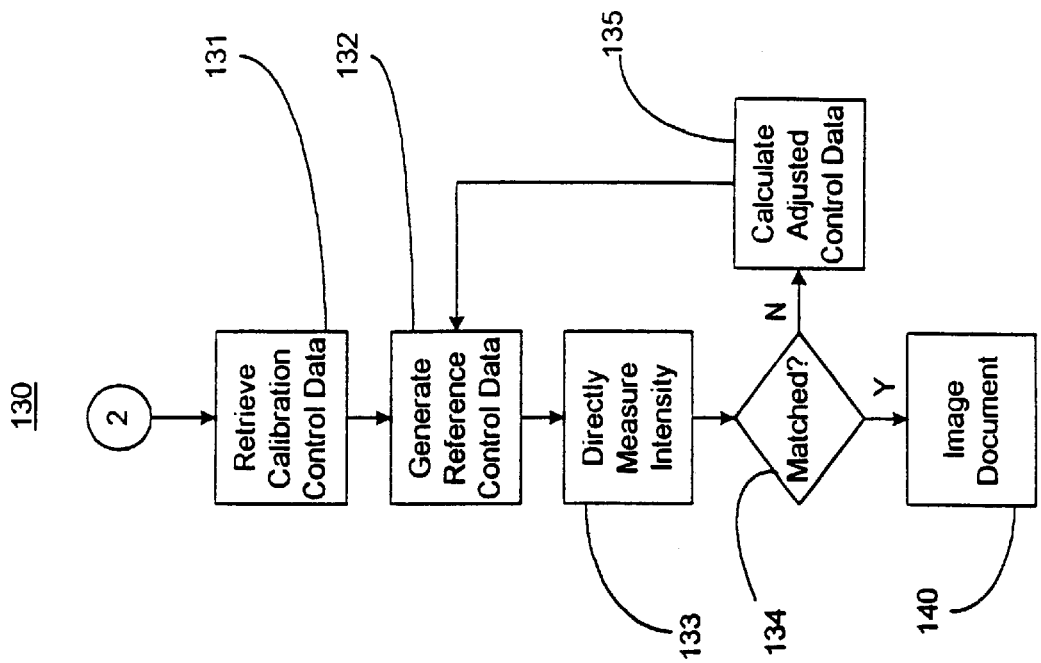
FIG. 8 is a more detailed flow chart of the step of generating adjusted control data in FIG. 5.

Turning now to FIG. 8, Step 130 of generating adjusted control data is shown in greater detail. Specifically, at Step 131 calibration control data is retrieved from the computer readable memory. Reference control data is then generated at Step 132 and the reference illumination intensity is directly measured at Step 133 with the CCD. At Step 134 it is determined whether the reference illumination intensity matches the calibration illumination intensity within an acceptable range of error. If there is not a match, Step 135 provides for calculating adjusted control data. Preferably, this is done by interval halving the difference between the reference control data and the calibration control data until a match is obtained. Thus, for each document imaged, the imaging system can be adjusted by a small amount to compensate for additional thermal drift. It will be appreciated that there are additional diagnostic benefits of the compensation reference such as detection of illumination failures, objects covering the document area, jams, or slips.

The invention has been described with reference to a detailed description of a preferred embodiment for the sake of example only. The scope of the invention is to be determined by proper interpretation of the appended claims.

What is claimed is:

1. A digital imaging system for an image-enabled document processor, the imaging system comprising:
    an illumination system for providing reflected illumination, the illumination system including a source system for generating source illumination in response to illumination control data, an optical system for providing the reflected illumination a path based on reflection of the source illumination by a subject, and a reflection system for exposing the subject to the source illumination;
    a CCD system for directly detecting the reflected illumination from the illumination system, the CCD system converting the reflected illumination into illumination data, representing an illumination intensity, according to CCD control data;
    a host processor for converting the illumination data from the CCD system into adjusted control data and final image data;
    wherein the reflection system includes a compensation reference disposed outside a document field of view, the compensation reference being the subject during adjustment of the imaging system;
    wherein the reflection system further includes a reference gage, different than the compensation reference, temporarily disposed in a document plane, the reference gage being the subject during calibration of the imaging system;
    wherein the reference gage is used to produce calibration control data including calibration illumination control data and calibration CCD control data, and the compensation reference is used to produce reference control data including reference illumination control data and reference CCD control data;
    wherein the adjusted control data is determined by diminishing a difference between the reference control data and the calibration control data until a reference illumination intensity matches a calibration illumination intensity; and
    whereby the reference gage allows a calibration of the imaging system and the compensation reference allows continual adjustment of the imaging system over time.

2. The digital imaging system of claim 1 wherein the source system further comprises:
    an LED control circuit for converting the illumination control data into illumination drive data;
    an LED drive circuit for converting the illumination drive data into illumination source data; and
    an LED board configuration having a first board and a second board, the LED board configuration generating source illumination.

3. The imaging system of claim 1 wherein the optical system further comprises:
    a lens configuration for collecting the reflected illumination and focusing the reflected illumination on the CCD system; and
    a mirror configuration for directing the reflected illumination to the lens configuration.

4. The imaging system of claim 1 wherein the reflection system further comprises:
    a rear track wall for providing mechanical guidance to a first side of a document, the document being the subject during imaging; and
    a front track wall for providing mechanical guidance to a second side of the document during imaging, the front track wall having a window allowing source illumination to interact with the document.

5. The imaging system of claim 1 wherein the CCD system further comprises:
    a CCD board having a CCD for directly detecting the reflected illumination, the CCD board converting the reflected illumination into illumination data; and
    a CCD controller for digitizing the illumination data and controlling the CCD board based on CCD control data.

6. The imaging system of claim 1 wherein the adjusted control data is determined by interval halving the difference between the reference control data and the calibration control data until the reference illumination intensity matches the calibration illumination intensity.

7. The imaging system of claim 1 wherein the reference illumination control data includes reference LED current data.

8. The imaging system of claim 1 wherein the reference CCD control data includes reference CCD gain data and reference CCD offset data.

9. The imaging system of claim 1 wherein the calibration illumination control data includes calibration LED current data.

10. The imaging system of claim 1 wherein the calibration CCD control data includes calibration CCD gain data and calibration CCD offset data.

11. The method of claim 1 wherein the adjusted control data is determined by interval halving the difference between the reference control data and the calibration control data until the reference illumination intensity matches the calibration illumination intensity.

12. The method of claim 1 wherein the reference illumination control data includes reference LED current data.

13. The method of claim 1 wherein the reference CCD control data includes reference CCD gain data and reference CCD offset data.

14. The method of claim 1 wherein the calibration illumination control data includes calibration LED current data.

15. The method of claim 1 wherein the calibration CCD control data includes calibration CCD gain data and calibration CCD offset data.

16. A method for use in a digital imaging system for an image-enabled document processor, the imaging system including an illumination system for providing reflected illumination, the illumination system including a source system for generating source illumination in response to illumination control data, an optical system for providing the reflected illumination a path based on reflection of the source illumination by a subject, and a reflection system for exposing the subject to the source illumination, the imaging system including a CCD system for directly detecting the reflected illumination from the illumination system, the CCD system converting the reflected illumination into illumination data, representing an illumination intensity, according to CCD control data, the imaging system including a host processor for converting the illumination data from the CCD system into adjusted control data and final image data, the method comprising:
    providing to the reflection system, a compensation reference disposed outside a document field of view, the compensation reference being the subject during adjustment of the imaging system;

providing to the reflection system, a reference gage, different than the compensation reference, temporarily disposed in a document plane, the reference gage being the subject during calibration of the imaging system;

using the reference gage, producing calibration control data including calibration illumination control data and calibration CCD control data;

using the compensation reference, producing reference control data including reference illumination control data and reference CCD control data; and determining the adjusted control data by diminishing a difference between the reference control data and the calibration control data until a reference illumination intensity matches a calibration illumination intensity whereby the reference gage allows a calibration of the imaging system and the compensation reference allows continual adjustment of the imaging system over time.

17. A computerized method for imaging a document, the method comprising the steps of:

generating an illumination profile for an imaging system wherein the illumination profile includes calibration illumination intensity and calibration control data;

generating adjusted control data for the imaging system based on the illumination profile and a reference illumination intensity;

imaging the document with the adjusted control data;

generating reference control data;

directly measuring the reference illumination intensity with a CCD;

calculating adjusted control data; and diminishing a difference between the reference control data and the calibration control data until the reference illumination intensity matches the calibration illumination intensity.

18. The method of claim 17 wherein diminishing is performed by interval halving.

* * * * *